Sept. 27, 1949.　　　　E. F. STEINHART　　　　2,483,245
FISHING LURE
Filed June 19, 1947

INVENTOR.
Edward F. Steinhart
BY
Eugene H. Purdy
Attorney

UNITED STATES PATENT OFFICE 2,483,245

FISHING LURE

Edward F. Steinhart, Wildwood Crest, N. J.

Application June 19, 1947, Serial No. 755,538

1 Claim. (Cl. 43—42.32)

This invention relates to fishing lures and has for an object to provide a lure which is so constructed and arranged as to serve more effectively for attracting the attention of fish as it is drawn through the water.

Another object of my invention is to provide a fishing lure which is adapted to reflect the sunlight downward through the water and to travel through the water with and up-and-down bobbing motion without spinning upon its longitudinal axis.

A further object of my invention is to provide a fishing lure in which the hooks are so secured to the lure as to prevent them from scraping the bed of the stream (or other body of water) and snagging the rocks, debris or vegetation lying thereon.

Other objects and advantages will be apparent from the following detailed description of a preferred embodiment of the invention, reference being had to the accompanying drawing in which.

Figure 1:
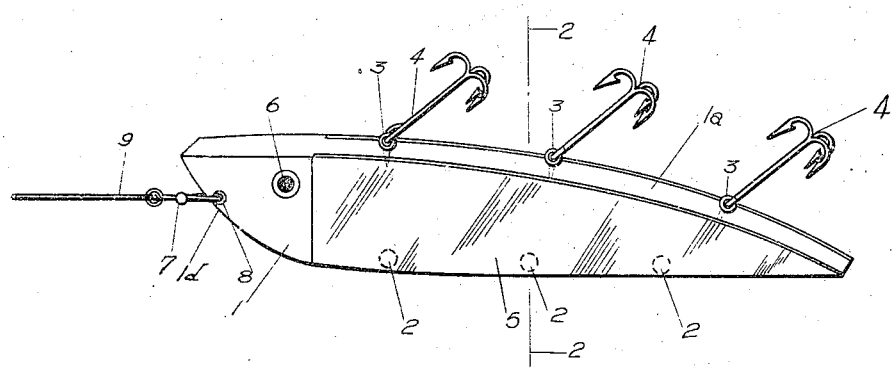
Fig. 1 is a perspective view of a fishing lure.

The fishing lure shown in the drawing comprises an elongated wedge-shaped wooden block 1 having flat, convergent sides 1a so that the lower edge face 1b is narrower (approximately one-half) than the upper edge face 1c. The upper edge face 1c is slightly convex or curved outwardly in a longitudinal direction and extends from the forward end of the lure at a downward inclination to intersect the straight lower edge face 1b, at the trailing end of the lure. The leading end of the lure is formed by a forward edge face 1d which extends prow-like upwardly and forwardly from the lower edge face 1b at an angle of approximately 45 degrees to intersect the upper edge face 1c, this forward edge face being slightly convex or curved outwardly, as shown in Fig 1.

The portion of the lure that is intended to ride lowermost in the water when the lure is in use is weighted by means of three metal plugs 2 inserted into openings formed in the body of the lure at spaced points intermediate its length.

Figure 2:
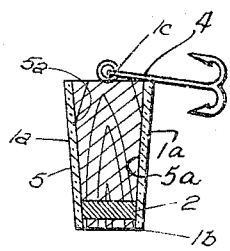
Figure 2 is a cross-sectional view through the lure of Fig. 1 taken on the line 2—2 thereof, showing the hooks in prone position.

Secured at spaced intervals along the top face 1c of the lure are eye-screws 3, each of these screws engaging the eye on the shank of a triple hook 4 so as to allow universal movement of the hook upon its screw. The hooks are restrained from dropping substantially below the plane of the upper edge face 1c, as best seen in Fig. 2, by reason of the engagement of the shanks or the barbed end of the hooks with the upper face 1c.

Then glass mirrors 5, silvered upon their inwardly disposed faces 5a, are cemented to the sides 1a of the lure. These mirrors extend from the trailing end of the lure to adjacent its leading end, terminating short of the leading end so as to afford a space which may be painted or fashioned to resemble the head of a small fish or insect, as for example by inserting beaded pins 6 in opposite sides of the lure for simulating the eyes of a fish. A swivel 7 passes through an opening 8 in the leading end of the lure and to this swivel the fishing line 9 is attached.

By virtue of the above construction, the flat, downwardly convergent sides of the lure in conjunction with the weights 2 resists the tendency of the lure to rotate about a longitudinal axis as it is drawn through the water. Furthermore, the flat glass mirrors 5 on the convergent sides of the lure reflect downwardly the sunlight that they receive from above more directly within the water, which is desirable for the reason that fish, as a rule, attack from below rather than on a level with the lure. The use of glass or plastic mirrors (silvered on their backs) is preferred over metal reflectors, which for some reason—probably because they lack the slight refractive power of glass mirrors—are not as efficient in provoking an aggressive attack by fish. The inclination of the sides 1a are such as not to shield the mirrors from the rays of sunlight, which would defeat the purpose of the mirrors. The inclination of the sides relative to a perpendicular preferably should not exceed 30 degrees.

The prow-like leading edge face 1d will cause up-and-down motion to be imparted to the lure as it is drawn through the water which bobbing motion serves as an additional means for arousing the attention of fish in the vicinity of the lure. Since the lower edge face 1b is straight and continuous and free of obstructions and because the hooks 4 are all mounted upon the upper edge face 1c in a manner such that they cannot drag substantially below the level of this upper face, the tendency of the hooks to become snagged on rocks, debris or underwater vegetation is greatly reduced.

While I prefer to make my lure from wood because of its naturally buoyant nature and its comparative low cost, the lure may be made of rubber, plastic, composition or other suitable material, hollowed out if necessary to impart buoyancy thereto. The lure may also be painted or decorated in any manner desired.

While I have described a preferred embodiment of my fishing lure, it is to be understood that various and reasonable changes in construction and design from those herein described and illustrated may be made without departing from the spirit of my invention as defined by the following claim.

I claim:

A fishing lure comprising a buoyant, relatively narrow solid block of generally wedge-shape having two opposite flat sides and its contour defined by a straight lower edge face, an inclined upper edge face intersecting the lower edge face at the trailing end of the lure and an upwardly and outwardly inclined leading edge face extending between the lower and upper edge faces, the sides of the block converging slightly downwardly and inwardly from the upper edge face toward its lower edge face, mirrors provided upon the opposite sides of the lure and covering the major portion of the area of said sides, weighting means in said block adjacent its lower edge face, and hooks secured to the upper edge face of the lure and supported thereby against movement substantially below the plane of said upper edge face, said block being entirely free from projections upon its lower edge face and sides, and the width of the upper edge face relative to the length of the shanks of the hooks being sufficient to prevent the shanks from dropping appreciably below the plane of said upper edge face.

EDWARD F. STEINHART.

REFERENCES CITED

The following references are of record in the file of this patent:

UNITED STATES PATENTS

| Number | Name | Date |
|---|---|---|
| D. 144,071 | Richards | Mar. 5, 1946 |
| 1,180,753 | Zeigler | Apr. 25, 1916 |
| 1,296,701 | Sakaue | Mar. 11, 1919 |
| 1,490,161 | Dickman | Apr. 15, 1924 |
| 1,526,713 | Lindberg | Feb. 17, 1925 |
| 1,710,908 | Vereecken | Apr. 30, 1929 |
| 1,813,843 | Flood | July 7, 1931 |

FOREIGN PATENTS

| Number | Country | Date |
|---|---|---|
| 651,252 | France | Oct. 8, 1928 |